United States Patent
Yamamoto

(10) Patent No.: US 8,305,613 B2
(45) Date of Patent: Nov. 6, 2012

(54) SERVER DEVICE, IMAGE FORMING APPARATUS, AND IMAGE PROCESSING SYSTEM FOR IMAGE PROCESSING IN A THIN CLIENT SYSTEM

(75) Inventor: Kohji Yamamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 975 days.

(21) Appl. No.: 12/318,730

(22) Filed: Jan. 7, 2009

(65) Prior Publication Data

US 2009/0174892 A1    Jul. 9, 2009

(30) Foreign Application Priority Data

Jan. 9, 2008  (JP) ................................. 2008-002446
Dec. 9, 2008  (JP) ................................. 2008-313204

(51) Int. Cl.
*G06F 3/12*   (2006.01)
*H04N 1/40*   (2006.01)

(52) U.S. Cl. ........................................ 358/1.15; 358/1.1

(58) Field of Classification Search .................... 358/1.1, 358/1.9, 1.13, 1.14, 1.15, 1.18, 400, 468; 709/201, 203, 214

See application file for complete search history.

(56) References Cited

U.S. PATENT DOCUMENTS 6,985,242 B1 *   1/2006   Toyoda ................. 358/1.15
2008/0079986 A1 *   4/2008   Ferlitsch ................ 358/1.15

FOREIGN PATENT DOCUMENTS

JP    2002-240368    8/2002
JP    2002-292943    10/2002

* cited by examiner

*Primary Examiner* — Gabriel Garcia
(74) *Attorney, Agent, or Firm* — Harness, Dickey & Pierce, P.L.C.

(57) ABSTRACT

An image forming apparatus, a client PC, and a thin client PC are connected to a server device via a network. The client PC, or the thin client PC, transmits a printing instruction to the server device and the server device transmits the printing instruction to the image forming apparatus. In a thin client environment, a network between the server device and the image forming apparatus can be a narrowband network. Therefore, the server device compresses the whole printing instruction and then transmits the compressed printing instruction to the image forming apparatus.

3 Claims, 16 Drawing Sheets

FIG. 5

| CONTROL ITEM | ID |
|---|---|
| RECEIVE BUFFER | ************************ |
| | ************************ |
| | ************************ |
| PDL BUFFER | ************************ |
| | ************************ |
| | ************************ |
| EXPANDING UNIT | ************************ |
| | ************************ |
| | ************************ |
| DECRYPTING UNIT | ************************ |
| | ************************ |
| | ************************ |
| ⋮ | ⋮ |

FIG. 8
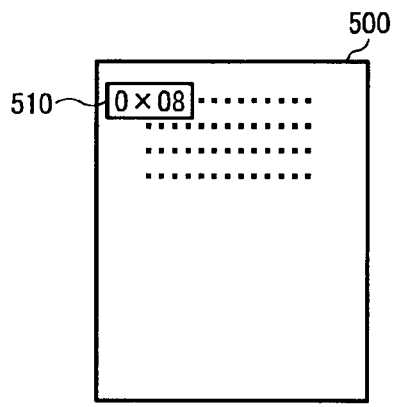
FIG. 9
| FILE FORMAT | MAGIC NUMBER | 410 |
|---|---|---|
| GZIP | 0×08 | CODE |
| LZH | XXX | |
| ... | ... | |
| ... | ... | |
FIG. 10
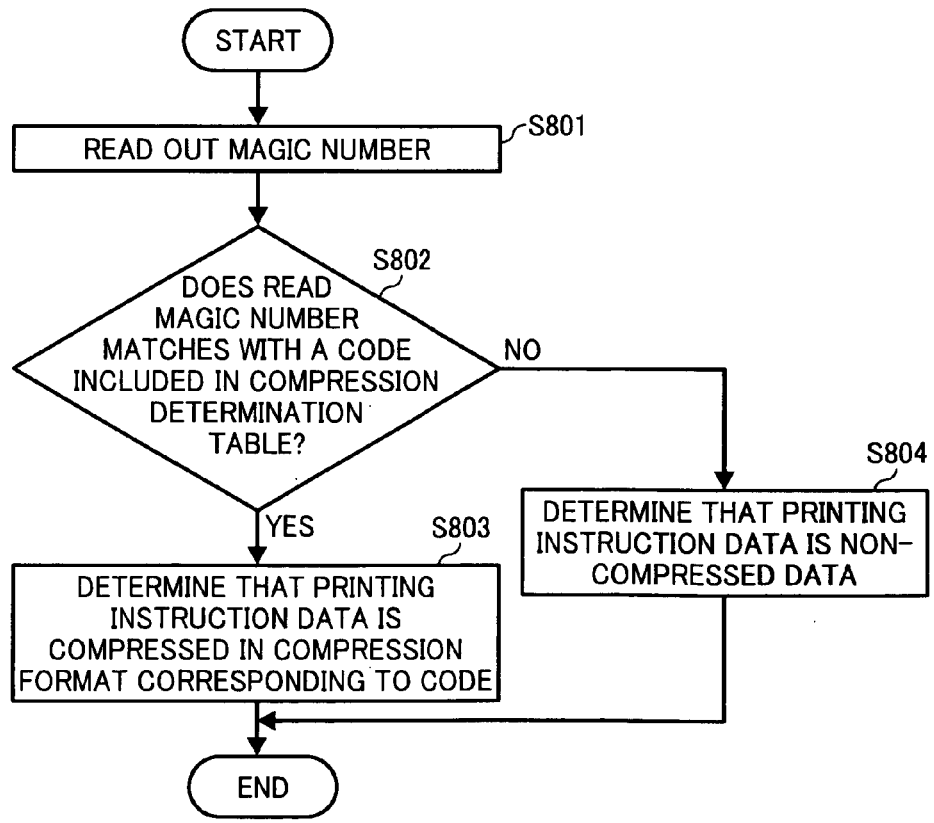

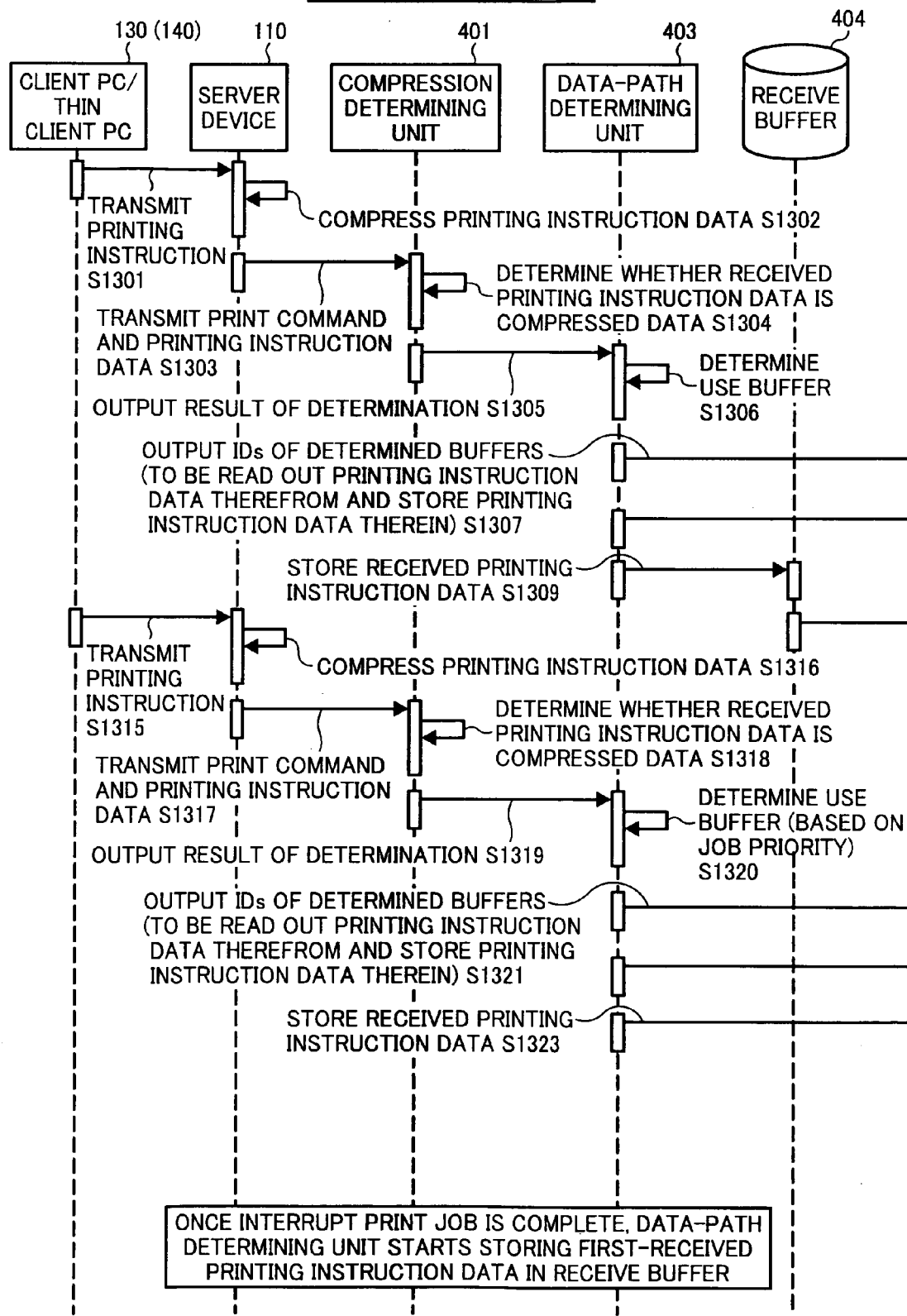

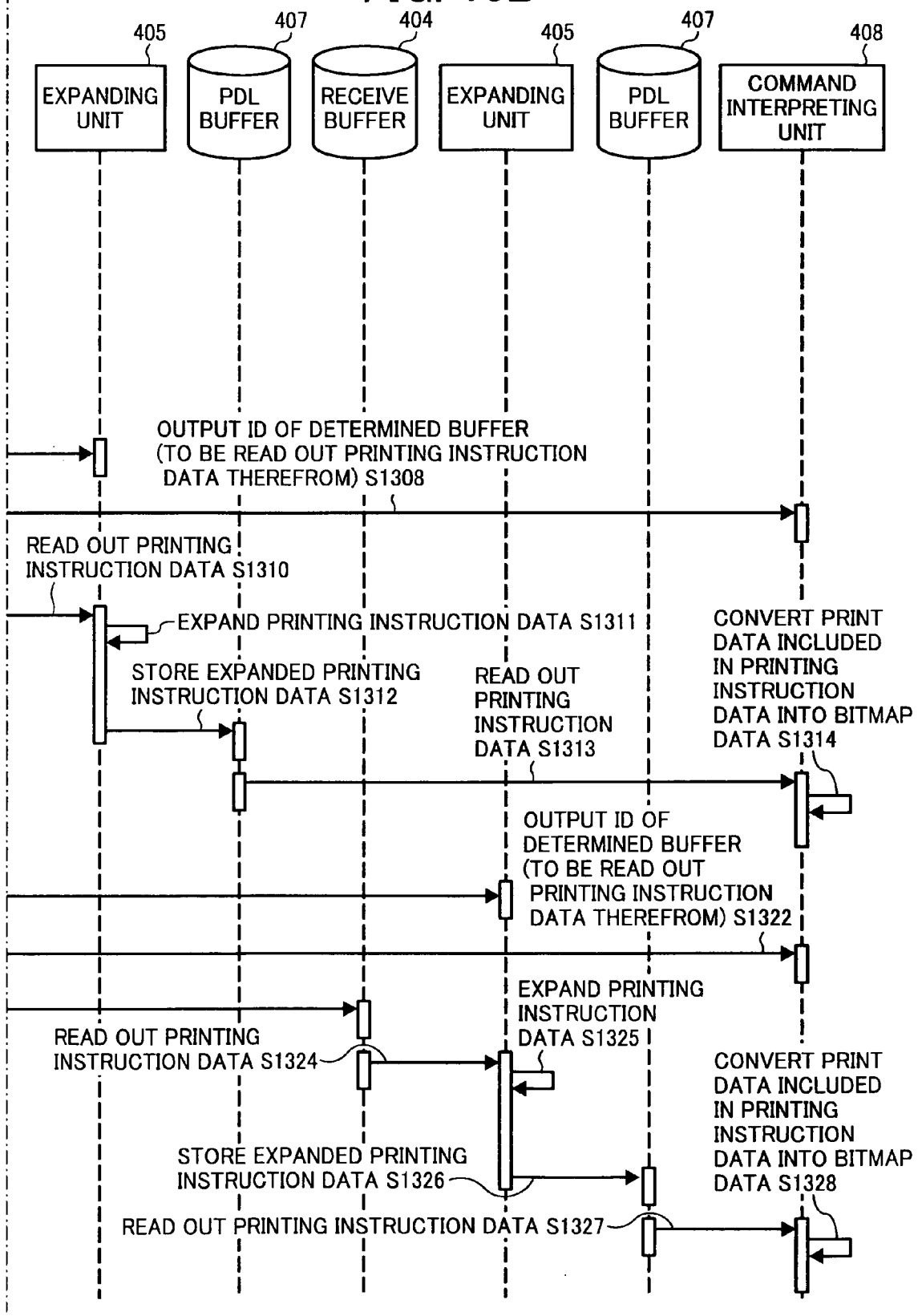

SERVER DEVICE, IMAGE FORMING APPARATUS, AND IMAGE PROCESSING SYSTEM FOR IMAGE PROCESSING IN A THIN CLIENT SYSTEM

CROSS-REFERENCE TO RELATED APPLICATIONS

The present application claims priority to and incorporates by reference the entire contents of Japanese priority document 2008-002446 filed in Japan on Jan. 9, 2008 and Japanese priority document 2008-313204 filed in Japan on Dec. 9, 2008.

BACKGROUND OF THE INVENTION

1. Field of the Invention

The present invention relates to a server device, an image forming apparatus, and an image processing system those capable of providing a smooth printing environment even in a thin client environment.

2. Description of the Related Art

In response to requests for a secure desktop environment with the increasing security needs, a thin client system has attracted attention in recent years. The thin client system is a generic name of a system including one or more client terminals and a server device in which the client terminals is allocated with the minimum number of functions while the server device manages all the resources such as applications and files. In the thin client system, because all the resources are managed by the server device, even a print job is executed by the server device. For example, when a print job is to be executed, the server device transmits printing instruction data including print data to a printer via a network thereby causing the printer to print out the print data.

Meantime, with requests for improvement in printing quality, a volume of printing instruction data has been getting larger in recent years. When a large volume of printing instruction data is transmitted, an efficient transmission of the printing instruction data in a network is desired. Therefore, to reduce network traffic, there has been developed such a solution that printing instruction data is compressed to reduce its data volume, and a printer expands the compressed printing instruction data and prints out print data. Related technology has been disclosed in, for example, Japanese Patent Application Laid-open No. 2002-292943 and Japanese Patent Application Laid-open No. 2002-240368.

FIG. 16 is a block diagram of a schematic configuration of a printer disclosed in Japanese Patent Application Laid-open No. 2002-292943 as an example of a conventional image forming apparatus. The printer can transfer image data either with or without involving an expanding unit 1403 provided on a data path connecting between a receive buffer 1401 and an image buffer 1402. Therefore, the printer can select an optimum data path depending on whether the received image data is compressed data and a volume of the image data. Thus, it is possible to reduce the involvement of a central processing unit (CPU) when the image data is transferred between the buffers.

However, in the technology disclosed in Japanese Patent Application Laid-open No. 2002-292943, the compression is applied to only the image data because it has a large data volume, i.e., the compression is not applied to the whole printing instruction data. In other words, the whole printing instruction data including data on a graphic and a text, information in a Printer Job Language (PJL), and the like is not compressed before sending the printing instruction data to a command interpreting unit 1404. For example, when the printing instruction data includes only text data, the printing instruction data is transmitted without being compressed. To provide a smooth printing environment in a thin client environment, it is necessary to reduce network traffic in such a manner that data to be transmitted from a server device to the printer is compressed thereby reducing a volume of the data. Therefore, when the compression is applied to only a large volume of image data, it is difficult to provide a smooth printing environment in the thin client environment.

Furthermore, in an apparatus disclosed in Japanese Patent Application Laid-open No. 2002-240368, upon receiving data on a still image in an arbitrary compressed file format from a higher-level device as input information, the apparatus converts the input data into bitmap data, and outputs the bitmap data to an image forming engine. Thus, this apparatus can expand the input data depending on the compressed file format employed to compress the input data.

However, the apparatus disclosed in Japanese Patent Application Laid-open No. 2002-240368 is designed to print out a high-resolution still image at high speed, and is not considered for a print job in a thin client environment at all. Therefore, the apparatus is not for providing a smooth printing environment in the thin client environment.

SUMMARY OF THE INVENTION

It is an object of the present invention to at least partially solve the problems in the conventional technology.

According to an aspect of the present invention, there is provided a server device connectable to a network and including a creating unit that creates printing instruction data; an encrypting unit that encrypts the printing instruction data thereby generating encrypted printing instruction data; and a compressing unit that compresses whole of the printing instruction data or whole of the encrypted printing instruction data.

According to another aspect of the present invention, there is provided an image forming apparatus connectable to a network and including a first buffer that temporarily stores therein printing instruction data received via the network; a compression determining unit that determines whether the printing instruction data is in compressed state; a expanding unit that expands compressed printing instruction data to obtain expanded printing instruction data; a second buffer that temporarily stores therein the expanded printing instruction data; a command interpreting unit that reads out any of the printing instruction data from the first buffer and the expanded printing instruction data from the second buffer, and converts read data into bitmap data; and a data-path determining unit that determines whether the printing instruction data temporarily-stored in the first buffer is to be sent to the expanding unit or to the command interpreting unit.

According to still another aspect of the present invention, there is provided an image processing system including a server device connectable to a network and including a creating unit that creates printing instruction data; an encrypting unit that encrypts the printing instruction data thereby generating encrypted printing instruction data; and a compressing unit that compresses whole of the printing instruction data or whole of the encrypted printing instruction data; an image forming apparatus connectable to the network and including a first buffer that temporarily stores therein printing instruction data received via the network; a compression determining unit that determines whether the printing instruction data is in compressed state; a expanding unit that expands compressed printing instruction data to obtain expanded printing instruction data; a second buffer that temporarily stores therein the expanded printing instruction data; a command interpreting unit that reads out any of the printing instruction data from the first buffer and the expanded printing instruction data from the second buffer, and converts read data into bitmap data; and a data-path determining unit that determines whether the printing instruction data temporarily-stored in the first buffer is to be sent to the expanding unit or to the command interpreting unit; and a client personal computer or a thin client personal computer that controls transmission of printing instruction data from the server device to the image forming apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 shows an example of an ID control table;

FIG. 8 is a schematic diagram of an example of print data;

FIG. 9 shows an example of a compression determination table stored in a compression determining unit shown in FIG. 4;

FIG. 10 is a flowchart of a compression determining process performed by the compression determining unit shown in FIG. 9;

FIG. 15 is a timing chart for explaining flows of two sets of printing instruction data in the image processing system shown in FIG. 1 when the image forming apparatus executes an interrupt print job.

DETAILED DESCRIPTION OF THE PREFERRED EMBODIMENTS

Exemplary embodiments of the present invention are explained in detail below with reference to the accompanying drawings.

Figure 1:
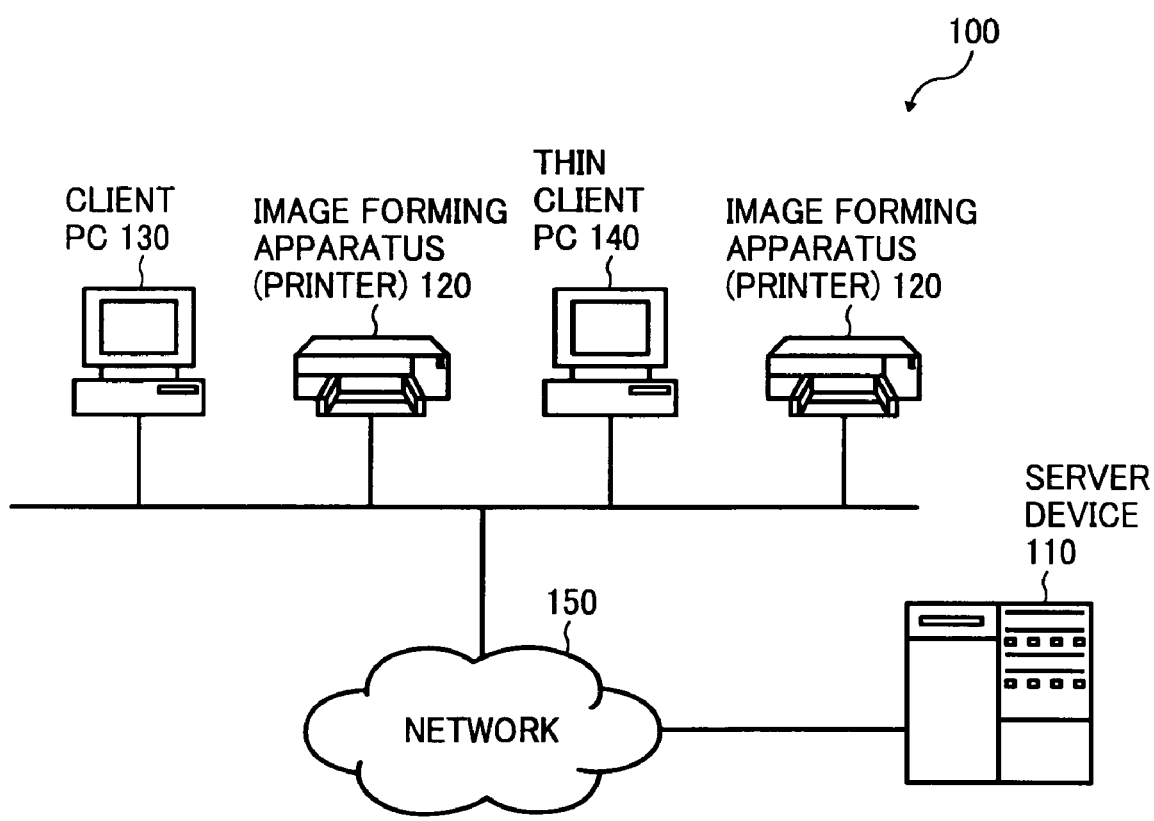
FIG. 1 is a schematic diagram of a configuration of an image processing system according to an embodiment of the present invention.

FIG. 1 is a schematic diagram of a configuration of an image processing system 100 according to an embodiment of the present invention. In the image processing system 100, an image forming apparatus (a printer) 120, a client personal computer (PC) 130, and a thin client PC 140 are connected to a server device 110 via a network 150. The client PC 130, or the thin client PC 140, transmits a printing instruction to the server device 110 via the network 150. In a thin client environment, a network between the server device 110 and the image forming apparatus 120 is assumed to be a narrowband network. In the present embodiment, the server device 110 compresses whole printing instruction data having a relatively large volume, and then transmits the compressed printing instruction data to the image forming apparatus 120.

Figure 2:
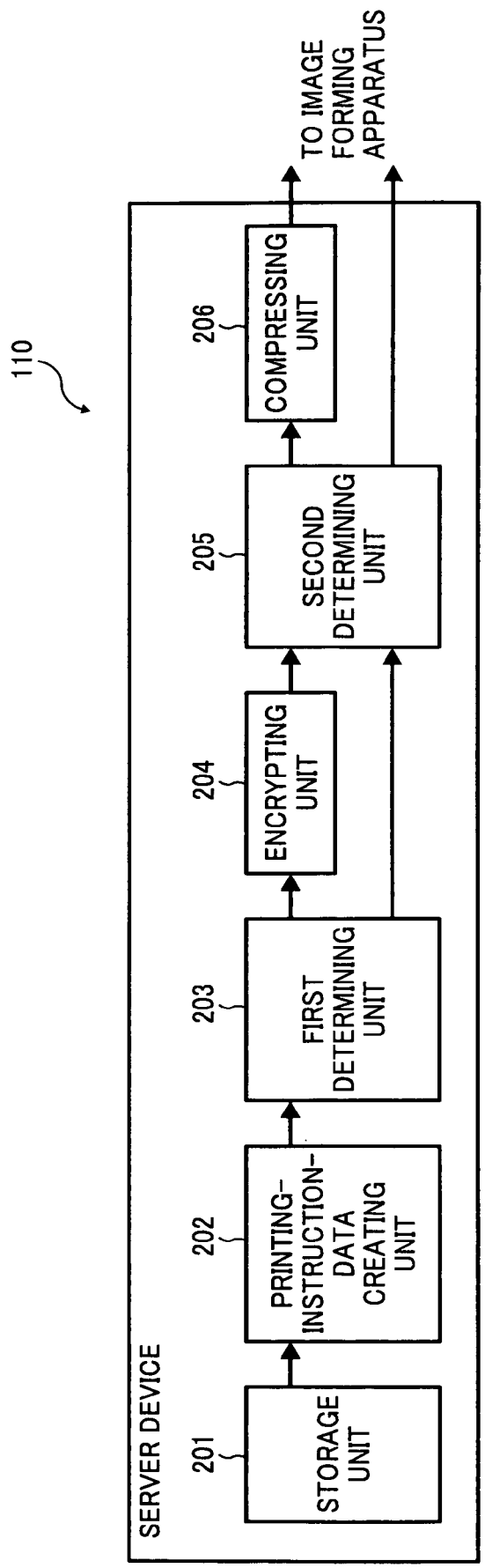
FIG. 2 is a functional block diagram of a server device shown in FIG. 1.

FIG. 2 is a functional block diagram of the server device 110. The server device 110 includes a storage unit 201, a printing-instruction-data creating unit 202, a first determining unit 203, an encrypting unit 204, a second determining unit 205, and a compressing unit 206.

The storage unit 201 stores therein print data. The printing-instruction-data creating unit 202 creates printing instruction data that a header and a footer those including predetermined information respectively are added to the print data acquired from the storage unit 201 in accordance with a printing instruction transmitted from the client PC 130, or the thin client PC 140. Details on the printing instruction data will be explained later. The first determining unit 203 determines whether the printing instruction data needs to be encrypted. For example, a printer driver (not shown) of the client PC 130, or the thin client PC 140, receives a user's instruction indicating whether to encrypt the printing instruction data, and stores information on the user's instruction as encryption information in the client PC 130 (or the thin client PC 140). The client PC 130 (or the thin client PC 140) transmits the encryption information together with the printing instruction to the server device 110. The first determining unit 203 determines whether the printing instruction data needs to be encrypted by referring to the encryption information. When determining that the printing instruction data needs to be encrypted, the first determining unit 203 outputs the printing instruction data to the encrypting unit 204. On the other hand, when determining that the printing instruction data need not to be encrypted, the first determining unit 203 outputs the printing instruction data to the second determining unit 205. Upon receiving the printing instruction data from the first determining unit 203, the encrypting unit 204 encrypts the printing instruction data with a predetermined encryption algorithm, and outputs the encrypted printing instruction data to the second determining unit 205. Upon receiving the printing instruction data, the second determining unit 205 determines whether the printing instruction data needs to be compressed. For example, the second determining unit 205 determines whether the printing instruction data needs to be compressed depending on whether a volume of the printing instruction data exceeds a predetermined volume (i.e., whether the printing instruction data has a volume causing a network traffic load). When determining that the printing instruction data needs to be compressed, the second determining unit 205 outputs the printing instruction data to the compressing unit 206. On the other hand, when determining that the printing instruction data need not to be compressed, the second determining unit 205 transmits the printing instruction data to the image forming apparatus 120 as a destination indicated in the printing instruction received from the client PC 130 (or the thin client PC 140). Upon receiving the printing instruction data from the second determining unit 205, the compressing unit 206 compresses the printing instruction data. At this time, the compressing unit 206 compresses the whole printing instruction data, and writes a magic number indicating a compression format on the header of the printing instruction data.

Incidentally, as shown in FIG. 2, the server device 110 is configured to compress the printing instruction data after encrypting the printing instruction data. Alternatively, the server device 110 can be configured to encrypt the printing instruction data after compressing the printing instruction data.

Figure 3A:
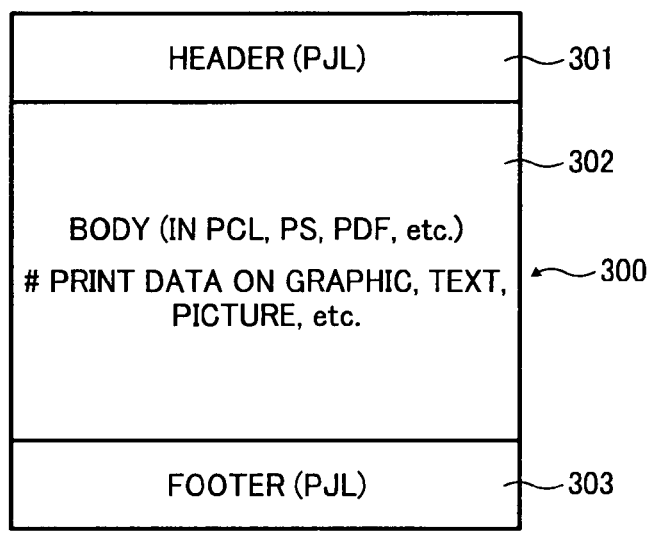
FIG. 3A is a data structure diagram of printing instruction data.
Figure 3B:
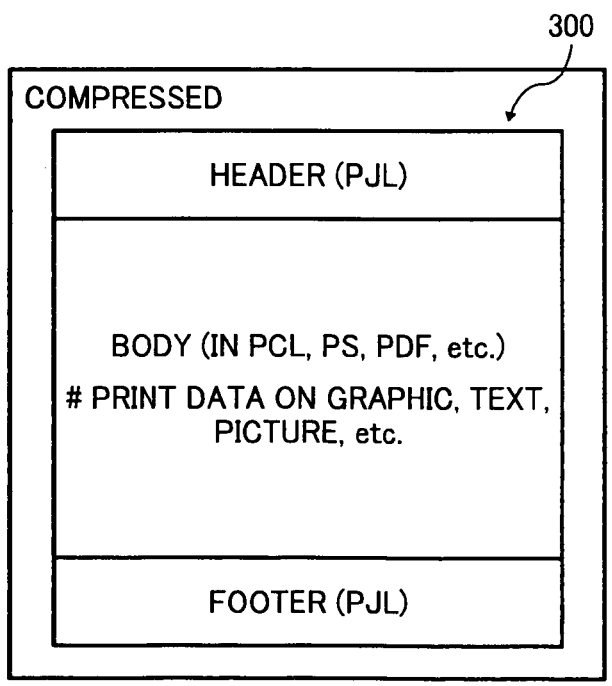
FIGS. 3B and 3C are data structure diagrams of the printing instruction data processed to be transmitted in the image processing system shown in FIG. 1.
Figure 3C:
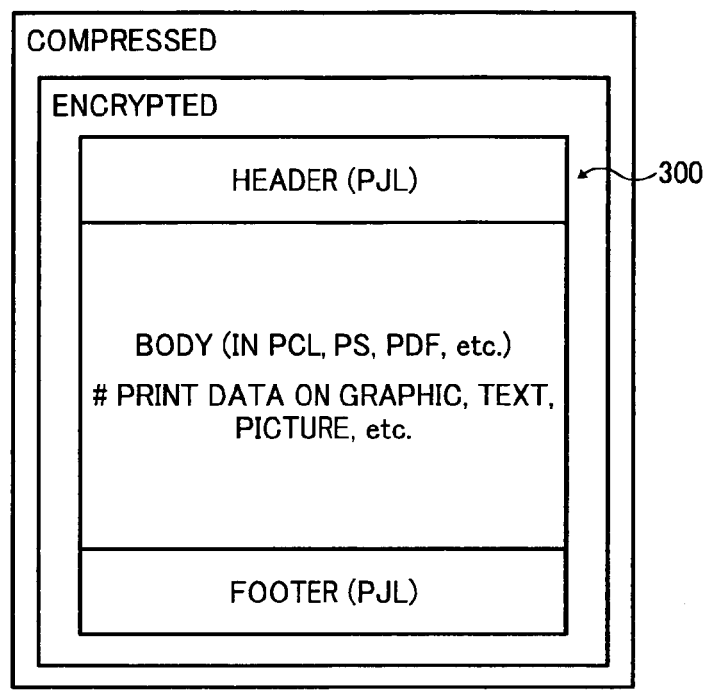
Figure 3D:
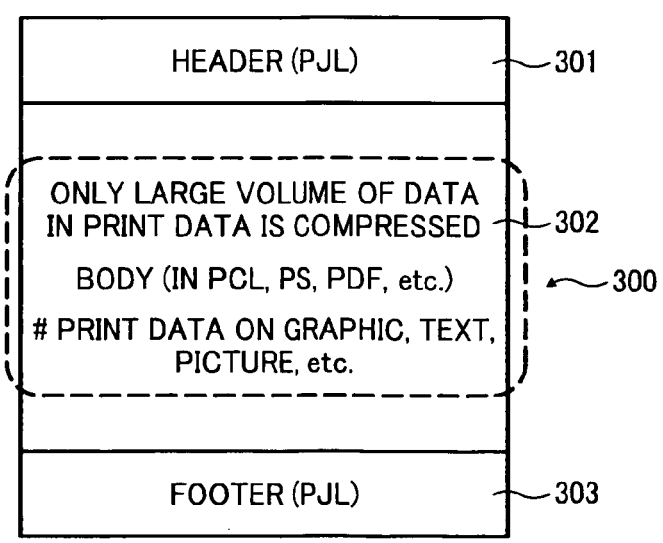
FIG. 3D is a data structure diagram of the printing instruction data processed to be transmitted in a conventional image processing system.

FIG. 3A is a data structure diagram of printing instruction data 300. FIGS. 3B and 3C are data structure diagrams of the printing instruction data 300 processed to be transmitted in the image processing system 100. FIG. 3D is a data structure diagram of the printing instruction data 300 processed to be transmitted in a conventional image processing system.

As shown in FIG. 3A, the printing instruction data 300 is composed of a header 301, a body including print data 302, and a footer 303. The header 301 is at the head of the printing instruction data 300, and includes information written in Printer Job Language (PJL). In addition, information on a level of importance of the print data 302 is written on the header 301. The print data 302 is data to be printed out by the image forming apparatus 120, and includes data on a graphic, a text, a picture, and the like. The print data 302 is written in Printer Control Language (PCL) or PostScript (PS), or formatted in a Portable Document Format (PDF). The footer 303 includes information written in PJL. In addition, information on the print data 302, such as a page number, a creation date, and a creator name, or the like is written on the footer 303.

In the conventional technology, as shown in FIG. 3D, only a large volume of data included in the print data 302 is compressed. On the other hand, in the present embodiment, when the printing instruction data 300 need not to be encrypted, as shown in FIG. 3B, the whole printing instruction data 300 is compressed. When the printing instruction data 300 needs to be encrypted, as shown in FIG. 3C, after the whole printing instruction data 300 is encrypted, the whole encrypted printing instruction data 300 is compressed. Because the whole printing instruction data 300 is compressed, a volume of the printing instruction data 300 can be reduced considerably than that is in the conventional technology. Therefore, network traffic between the server device 110 and the image forming apparatus 120 can be reduced, and thus it is possible to transmit/receive the printing instruction data 300 efficiently.

Incidentally, in the example shown in FIG. 3C, after the printing instruction data 300 is first encrypted and then compressed. Alternatively, the server device 110 can be configured to first compress the printing instruction data 300 and then encrypt.

Figure 4:
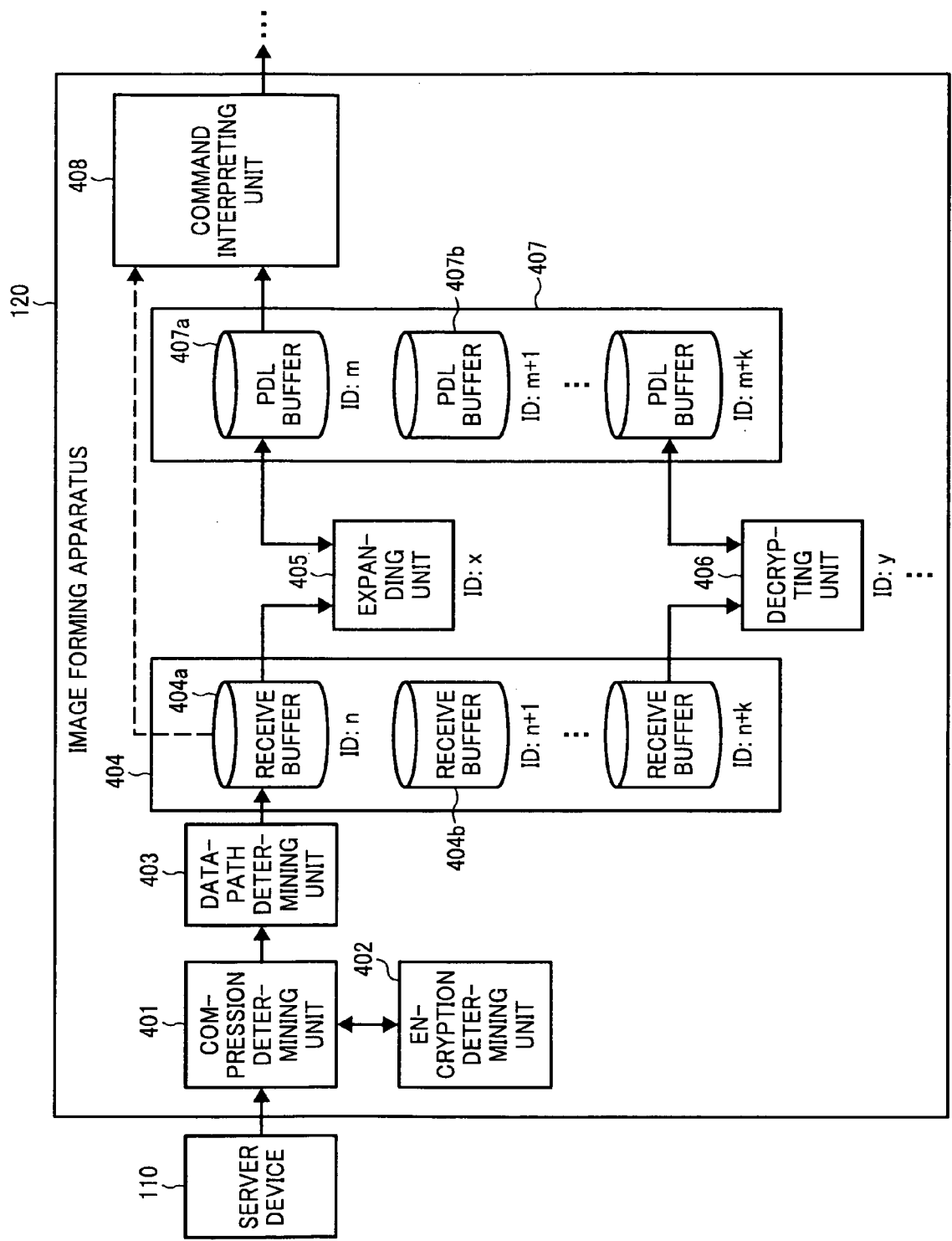
FIG. 4 is a functional block diagram of an image forming apparatus shown in FIG. 1.

FIG. 4 is a functional block diagram of the image forming apparatus 120. The image forming apparatus 120 includes a compression determining unit 401, an encryption determining unit 402, a data-path determining unit 403, a receive buffer (a first buffer) 404, an expanding unit 405, a decrypting unit 406, a PDL buffer (a second buffer) 407, and a command interpreting unit 408.

The compression determining unit 401 determines whether printing instruction data received from the server device 110 is compressed data. The encryption determining unit 402 determines whether the received printing instruction data is encrypted data. The data-path determining unit 403 determines a data path of the received printing instruction data. The data-path determining unit 403 determines a data path of the received printing instruction data, for example, based on a job priority of the received printing instruction data. Specifically, the data-path determining unit 403 determines a destination buffer where the printing instruction data is to be temporarily stored, and thereby determining the data path of the printing instruction data. When the data-path determining unit 403 determines the destination buffer, the data-path determining unit 403 informs each of the corresponding units of an identification (ID) of the destination buffer so that each of the units can read out the printing instruction data from the buffer corresponding to the ID or store the printing instruction data on the buffer corresponding to the ID. The receive buffer 404 includes a plurality of buffers (receive buffers 404a, 404b, and so on), and temporarily stores therein the printing instruction data. The expanding unit 405 reads out the compressed printing instruction data from any of the buffers in the receive buffer 404, and expands the compressed printing instruction data. The decrypting unit 406 decrypts the printing instruction data when the encryption determining unit 402 determines that the printing instruction data is encrypted data. The PDL buffer 407 includes a plurality of buffers (PDL buffers 407a, 407b, and so on), and temporarily stores therein the printing instruction data before the printing instruction data is converted into bitmap data. The command interpreting unit 408 receives an ID of any of the buffers from the data-path determining unit 403, and reads out the printing instruction data from the buffer corresponding to the ID. The command interpreting unit 408 converts print data included in the read printing instruction data into bitmap data. Incidentally, when the image forming apparatus 120 includes a plurality of the expanding units 405 or a plurality of the decrypting units 406, the image forming apparatus 120 can execute an interrupt print job.

Subsequently, how the data-path determining unit 403 determines a destination buffer is explained in detail below. As shown in FIG. 4, the image forming apparatus 120 includes the receive buffer 404 including a plurality of the buffers, the PDL buffer 407 including a plurality of the buffers, the expanding unit 405, and the decrypting unit 406. A unique ID is assigned to each of the buffers included in the receive buffers 404, the buffers included in the PDL buffers 407, the expanding unit 405, and the decrypting unit 406. The IDs are stored in an ID control table (see FIG. 5).

FIG. 5 shows an example of the ID control table. The data-path determining unit 403 determines destination buffers, i.e., any of the buffers in the receive buffers 404 and the PDL buffers 407 based on the ID control table. For example, when the printing instruction data is non-compressed data, to increase a processing efficiency (i.e., to avoid wasteful reading/writing), the data-path determining unit 403 determines the destination buffer such that the printing instruction data can be passed to the command interpreting unit 408 without involving the expanding unit 405 (in this case, for example, the receive buffer 404b), and outputs an ID of the destination buffer (an ID of the receive buffer 404b, i.e., an ID of n+1) to the command interpreting unit 408 so that the command interpreting unit 408 can read out the printing instruction data from the buffer corresponding to the ID. On the other hand, when the printing instruction data is compressed data, the data-path determining unit 403 determines such the destination buffers such that the printing instruction data can be passed to the command interpreting unit 408 with involving the expanding unit 405 (in this case, for example, the receive buffer 404a as a read buffer and the PDL buffer 407a as a write buffer), and outputs an ID of the destination read buffer and an ID of the destination write buffer (an ID of the receive buffer 404a and an ID of the PDL buffer 407a, i.e., an ID of n and an ID of m) to the expanding unit 405 so that the expanding unit 405 can read out the printing instruction data from the buffer corresponding to the read buffer ID and store the printing instruction data in the buffer corresponding to the write buffer ID after the expanding unit 405 expands the printing instruction data. In addition, the data-path determining unit 403 outputs the ID of the destination read buffer (the ID of the PDL buffer 407a, i.e., the ID of m) to the command interpreting unit 408 so that the command interpreting unit 408 can read out the printing instruction data from the buffer corresponding to the read buffer ID. In this manner, when the printing instruction data is compressed data, the data-path determining unit 403 determines a data path (i.e., a destination buffer) so that the printing instruction data passes through the expanding unit 405 to the command interpreting unit 408. Similarly, when the printing instruction data is encrypted data, the data-path determining unit 403 determines a data path (i.e., a destination buffer) so that the printing instruction data passes through the decrypting unit 406 to the command interpreting unit 408. Incidentally, the image forming apparatus 120 can first perform any of the expansion and the decryption of the printing instruction data. Therefore, the image forming apparatus 120 can be configured to perform the expansion and the decryption in the order depending on a data structure of the printing instruction data. Furthermore, the image forming apparatus 120 includes a plurality of the buffers, so that the image forming apparatus 120 can perform multiple data conversions at the same time.

Moreover, it is assumed that the image forming apparatus 120 handles compressed printing instruction data. There is a possibility that the printing instruction data is corrupted during the process of compression. The corrupted data may cause an error when the data is expanded. To avoid such a trouble, the expanding unit 405 includes an error-avoidance function to avoid an error caused by corrupted data.

Figure 6:
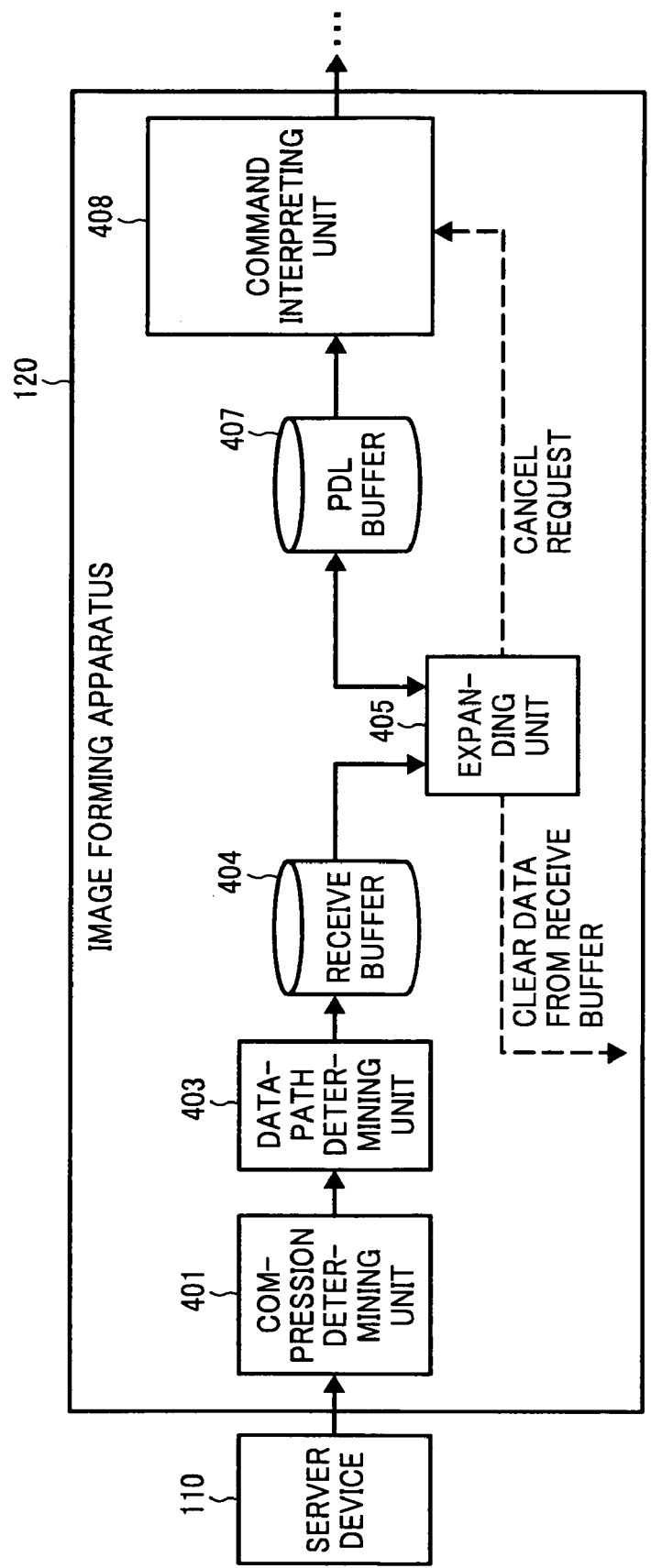
FIG. 6 is a block diagram for explaining an error-avoidance function of an expanding unit included in the image forming apparatus.

FIG. 6 is a block diagram for explaining the error-avoidance function of the expanding unit 405. When the expanding unit 405 detects corrupted data, the expanding unit 405 outputs a cancel request to the command interpreting unit 408. Upon receiving the cancel request, the command interpreting unit 408 cancels reading of data from the PDL buffer 407. After that, the expanding unit 405 clears the data (the corrupted data) received from the receive buffer 404. In this manner, an error due to corrupted data can be avoided.

Figure 7:
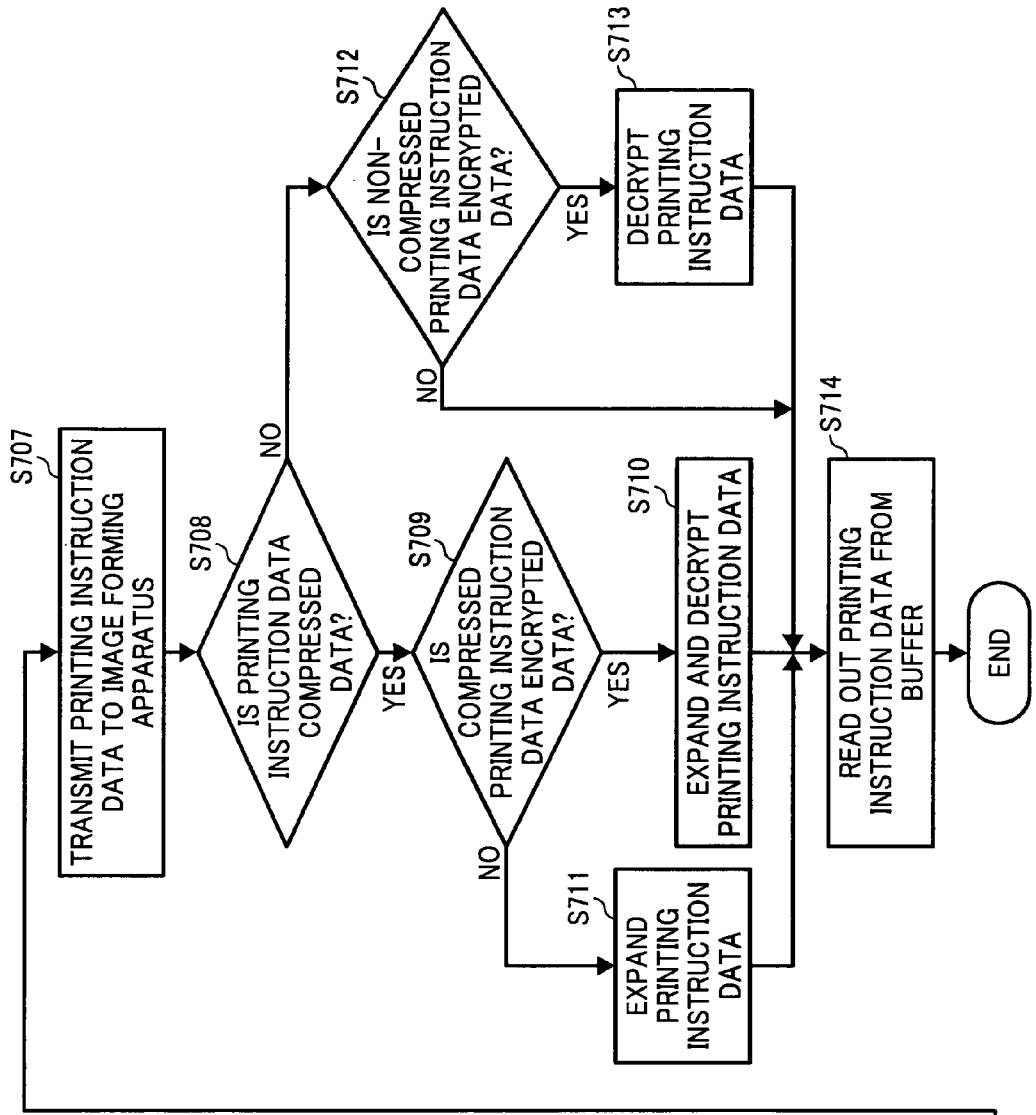
FIG. 7 is a flowchart of a data processing procedure performed by the image processing system shown in FIG. 1.

Subsequently, a data processing procedure of the image processing system 100 is explained below. FIG. 7 is a flowchart of the data processing procedure of the image processing system 100.

First, the client PC 130 (or the thin client PC 140) transmits a printing instruction to the server device 110 via the network 150 (Step S701). Upon receiving the printing instruction, the printing-instruction-data creating unit 202 acquires print data that is appropriate to the printing instruction from the storage unit 201, and creates printing instruction data that a header and a footer those including predetermined information respectively are added to the print data (Step S702).

Then, the first determining unit 203 determines whether the printing instruction data needs to be encrypted (Step S703). For example, the first determining unit 203 determines whether the printing instruction data needs to be encrypted based on encryption information received from the client PC 130 (or the thin client PC 140). When the first determining unit 203 determines that the printing instruction data need not to be encrypted (NO at Step S703), the process control goes to Step S705.

On the other hand, when the first determining unit 203 determines that the printing instruction data needs to be encrypted (YES at Step S703), the encrypting unit 204 encrypts the printing instruction data with a predetermined encryption algorithm (Step S704).

Then, the second determining unit 205 determines whether the printing instruction data needs to be compressed (Step S705). In the present embodiment, the second determining unit 205 determines whether the printing instruction data needs to be compressed depending on whether a volume of the printing instruction data exceeds a predetermined volume (i.e., whether the printing instruction data has a volume causing a network traffic load). When the second determining unit 205 determines that the printing instruction data need not to be compressed (NO at Step S705), the process control goes to Step S707. Incidentally, the printing instruction from the client PC 130 (or the thin client PC 140) can be configured to transmit compression information indicating whether to compress the printing instruction data together with the printing instruction data to the server device 110 so that the second determining unit 205 can determine whether the printing instruction data needs to be compressed based on the compression information. In this case, for example, the printer driver of the client PC 130 (or the thin client PC 140) receives a user's instruction indicating whether to compress the printing instruction data, and stores information on the user's instruction as compression information in the client PC 130 (or the thin client PC 140).

On the other hand, when the second determining unit 205 determines that the printing instruction data needs to be compressed (YES at Step S705), the compressing unit 206 compresses the printing instruction data (Step S706). Specifically, the compressing unit 206 compresses the printing instruction data into a compressed file in a compression format defined by a magic number that is assigned to print data created by a user. The magic number is, for example, a code string indicating a compression format, such as GZIP or LZH. FIG. 8 is a schematic diagram of an example of print data 500. When a user of the client PC 130 (or the thin client PC 140) creates the print data 500 with an application, as shown in FIG. 8, a code 510 (in this example, "0x08") of the magic number is automatically written on a header of the print data 500 by the application. The compressing unit 206 compresses the printing instruction data in a compression format corresponding to a code of the magic number written on a header of the printing instruction data.

To return to the explanation of the flowchart shown in FIG. 7, the server device 110 transmits the printing instruction data to the image forming apparatus 120 (Step S707).

When the image forming apparatus 120 receives the printing instruction data from the server device 110, the compression determining unit 401 determines whether the received printing instruction data is compressed data (Step S708). How the compression determining unit 401 determines whether the received printing instruction data is compressed data will be explained in detail later. When the compression determining unit 401 determines that the received printing instruction data is compressed data (YES at Step S708), the encryption determining unit 402 determines whether the received printing instruction data is encrypted data (Step S709). When the encryption determining unit 402 determines that the received printing instruction data is encrypted data (YES at Step S709), the expanding unit 405 expands the printing instruction data and then the decrypting unit 406 decrypts the expanded printing instruction data (Step S710). In this case, the data-path determining unit 403 determines such a destination buffer that the printing instruction data passes through the expanding unit 405 and the decrypting unit 406 so as to be expanded by the expanding unit 405 and then decrypted by the decrypting unit 406. After decrypting the printing instruction data, the decrypting unit 406 temporarily stores the printing instruction data in the PDL buffer 407. After that, the command interpreting unit 408 reads out the printing instruction data from the PDL buffer 407 (Step S714).

On the other hand, when the encryption determining unit 402 determines that the received printing instruction data is not encrypted data (NO at Step S709), the expanding unit 405 expands the printing instruction data (Step S711). In this case, the data-path determining unit 403 determines such a destination buffer that the printing instruction data passes through the expanding unit 405 so as to be expanded by the expanding unit 405. After expanding the printing instruction data; the expanding unit 405 temporarily stores the printing instruction data in the PDL buffer 407. After that, the command interpreting unit 408 reads out the printing instruction data from the PDL buffer 407 (Step S714).

When the compression determining unit 401 determines that the received printing instruction data is not compressed data (NO at Step S708), the encryption determining unit 402 determines whether the received non-compressed printing instruction data is encrypted data (Step S712). When the encryption determining unit 402 determines that the received non-compressed printing instruction data is encrypted data (YES at Step S712), the decrypting unit 406 decrypts the printing instruction data (Step S713). In this case, the data-path determining unit 403 determines such a destination buffer that the printing instruction data passes through the decrypting unit 406 so as to be decrypted by the decrypting unit 406. After decrypting the printing instruction data, the decrypting unit 406 temporarily stores the printing instruction data in the PDL buffer 407. After that, the command interpreting unit 408 reads out the printing instruction data from the PDL buffer 407 (Step S714).

On the other hand, when the encryption determining unit 402 determines that the received non-compressed printing instruction data is not encrypted data (NO at Step S712), the command interpreting unit 408 reads out the printing instruction data directly from the receive buffer 404 (Step S714). In this case, the data-path determining unit 403 determines such a destination buffer that the printing instruction data does not pass through the expanding unit 405 and the decrypting unit 406. That is, the printing instruction data passes through the receive buffer 404 to the command interpreting unit 408.

Subsequently, how the compression determining unit 401 determines whether the printing instruction data is compressed data at Step S708 is explained in detail below. When data is compressed by using a compression algorithm, a code indicating a compression format is always written on a header of the compressed data as a magic number. When the magic number matches with any code indicating a compression format, it means that the data is compressed in the compression format corresponding to the code. When the magic number does not match with any code, it means that the data is non-compressed data. FIG. 9 is a compression determination table 410 stored in the compression determining unit 401. In the compression determination table 410, compression format is associated with magic number in code. The compression determining unit 401 determines whether the printing instruction data is compressed data by verifying whether a code of the magic number written on a header of the printing instruction data is matched with any of the codes included in the compression determination table 410. A process for determining whether the printing instruction data is compressed data is explained below with reference to FIG. 10.

FIG. 10 is a flowchart of a compression determining process performed by the compression determining unit 401. First, the compression determining unit 401 reads out a code of the magic number from the received printing instruction data (Step S801). Then, the compression determining unit 401 verifies whether the code of the magic number read out from the printing instruction data matches with any of the codes of the magic number included in the compression determination table 410 (Step S802). When the code of the magic number read out from the printing instruction data matches with a code included in the compression determination table 410, i.e., the code of the magic number read out from the printing instruction data matches with the code of the magic number indicating a compression format (YES at Step S802), the compression determining unit 401 determines that the printing instruction data has been compressed in the compression format (Step S803). On the other hand, when the code of the magic number read out from the printing instruction data does not match with any of the codes included in the compression determination table 410, i.e., the code of the magic number read out from the printing instruction data does not match with any of the codes of the magic number indicating a compression format (NO at Step S802), the compression determining unit 401 determines that the printing instruction data is non-compressed data (Step S804).

Figure 11:
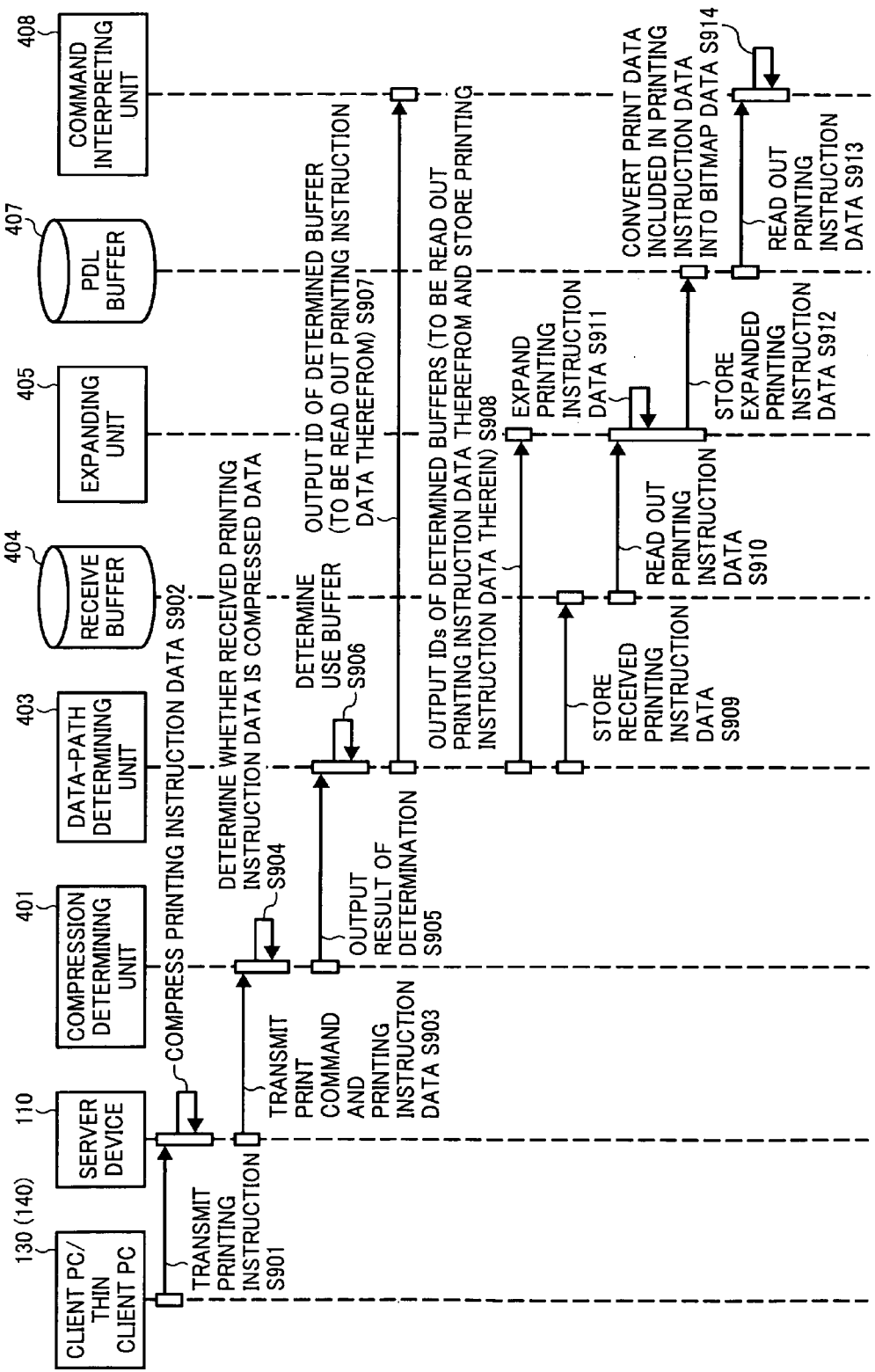
FIG. 11 is a timing chart for explaining a flow of printing instruction data in the image processing system shown in FIG. 1 when the printing instruction data is compressed but not encrypted.

Subsequently, a flow of printing instruction data in the image processing system 100 is explained in detail below with reference to FIG. 11. FIG. 11 is a timing chart for explaining a flow of printing instruction data in the image processing system 100 when the printing instruction data is compressed but not encrypted.

First, the client PC 130 (or the thin client PC 140) transmits a printing instruction to the server device 110 via the network 150 (Step S901). At this time, the client PC 130 (or the thin client PC 140) also transmits an instruction for compressing printing instruction data to the server device 110.

When the server device 110 receives the instructions from the client PC 130 (or the thin client PC 140), the compressing unit 206 compresses whole printing instruction data including print data on a graphic and a text and information written in PJL (Step S902).

After that, the server device 110 transmits a print command together with the compressed printing instruction data to the image forming apparatus 120 (Step S903).

When the image forming apparatus 120 receives the print command and the printing instruction data from the server device 110, the compression determining unit 401 determines whether the received printing instruction data is compressed data (Step S904). Incidentally, when the printing instruction data is compressed data, the compression determining unit 401 determines a compression format of the printing instruction data by verifying the magic number written on a header of the printing instruction data.

When the compression determining unit 401 determines that the printing instruction data is compressed data, the compression determining unit 401 outputs a result of the determination to the data-path determining unit 403 (Step S905).

Upon receiving the result of the determination from the compression determining unit 401, the data-path determining unit 403 determines destination buffers, i.e., any of the receive buffers in the receive buffer 404 and any of the PDL buffers in the PDL buffer 407 (used for temporarily storing therein the printing instruction data) based on the result of the determination (Step S906).

The data-path determining unit 403 outputs an ID of the destination PDL buffer to the command interpreting unit 408 so that the command interpreting unit 408 can read out the printing instruction data from the PDL buffer corresponding to the ID (Step S907).

Furthermore, the data-path determining unit 403 outputs an ID of the destination receive buffer and the ID of the destination PDL buffer to the expanding unit 405 so that the expanding unit 405 can read out the printing instruction data from the receive buffer corresponding to the ID and store the printing instruction data in the PDL buffer corresponding to the ID after the expanding unit 405 expands the printing instruction data (Step S908).

After that, the data-path determining unit 403 stores the received printing instruction data in the destination receive buffer in the receive buffer 404 (Step S909).

The expanding unit 405 reads out the printing instruction data stored at Step S909 from the receive buffer corresponding to the ID in the receive buffer 404 (Step S910).

The expanding unit 405 expands the printing instruction data read out at Step S910 (Step S911).

The expanding unit 405 stores the printing instruction data expanded at Step S911 in the PDL buffer corresponding to the ID in the PDL buffer 407 (Step S912).

The command interpreting unit 408 reads out the printing instruction data stored by the expanding unit 405 at Step S912 from the PDL buffer corresponding to the ID in the PDL buffer 407 (Step S913).

The command interpreting unit 408 converts the print data included in the printing instruction data read out at Step S913 into bitmap data (Step S914).

Figure 12:
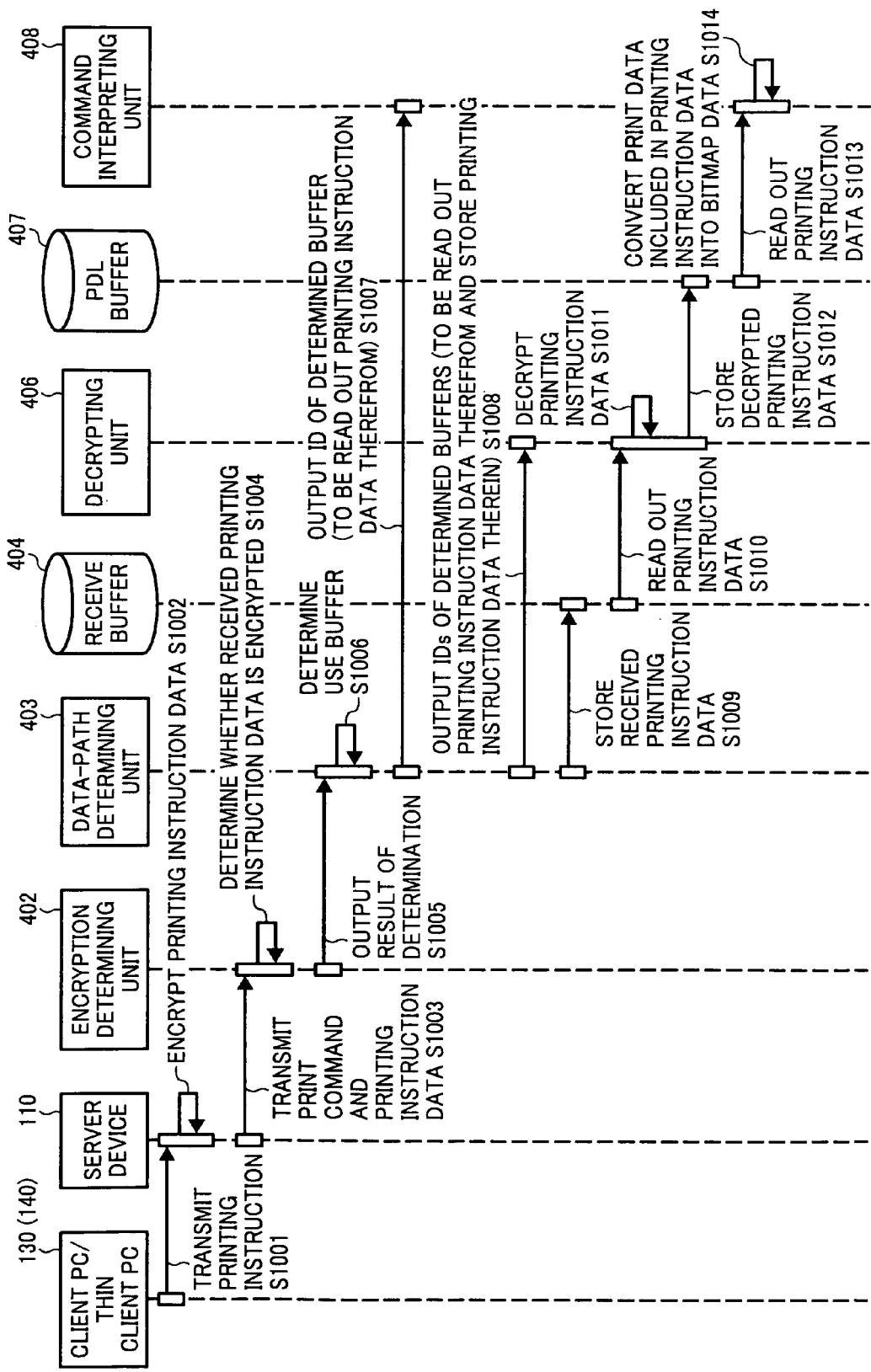
FIG. 12 is a timing chart for explaining a flow of printing instruction data in the image processing system shown in FIG. 1 when the printing instruction data is encrypted but not compressed.

FIG. 12 is a timing chart for explaining a flow of printing instruction data in the image processing system 100 when the printing instruction data is encrypted but not compressed.

First, the client PC 130 (or the thin client PC 140) transmits a printing instruction to the server device 110 via the network 150 (Step S1001). At this time, the client PC 130 (or the thin client PC 140) also transmits an instruction for encrypting printing instruction data to the server device 110.

When the server device 110 receives the instructions from the client PC 130 (or the thin client PC 140), the encrypting unit 204 encrypts whole printing instruction data including print data on a graphic and a text and information written in the PJL (Step S1002).

After that, the server device 110 transmits a print command together with the encrypted printing instruction data to the image forming apparatus 120 (Step S1003).

When the image forming apparatus 120 receives the print command and the printing instruction data from the server device 110, the encryption determining unit 402 determines whether the received printing instruction data is encrypted (Step S1004).

When the encryption determining unit 402 determines that the received printing instruction data is encrypted, the encryption determining unit 402 outputs a result of the determination to the data-path determining unit 403 (Step S1005).

Upon receiving the result of the determination from the encryption determining unit 402, the data-path determining unit 403 determines destination buffers, i.e., any of the receive buffers in the receive buffer 404 and any of the PDL buffers in the PDL buffer 407 (used for temporarily storing therein the printing instruction data) based on the result of the determination (Step S1006).

The data-path determining unit 403 outputs an ID of the destination PDL buffer to the command interpreting unit 408 so that the command interpreting unit 408 can read out the printing instruction data from the PDL buffer corresponding to the ID (Step S1007).

Furthermore, the data-path determining unit 403 outputs an ID of the destination receive buffer and the ID of the destination PDL buffer to the decrypting unit 406 so that the decrypting unit 406 can read out the printing instruction data from the receive buffer corresponding to the ID and store the printing instruction data in the PDL buffer corresponding to the ID after the decrypting unit 406 decrypts the printing instruction data (Step S1008).

After that, the data-path determining unit 403 stores the received printing instruction data in the destination receive buffer in the receive buffer 404 (Step S1009).

The decrypting unit 406 reads out the printing instruction data stored at Step S1009 from the receive buffer corresponding to the ID in the receive buffer 404 (Step S1010).

The decrypting unit 406 decrypts the printing instruction data read out at Step S1010 (Step S1011).

The decrypting unit 406 stores the printing instruction data decrypted at Step S1011 in the PDL buffer corresponding to the ID in the PDL buffer 407 (Step S1012).

The command interpreting unit 408 reads out the printing instruction data stored by the decrypting unit 406 at Step S1012 from the PDL buffer corresponding to the ID in the PDL buffer 407 (Step S1013).

The command interpreting unit 408 converts the print data included in the printing instruction data read out at Step S1013 into bitmap data (Step S1014).

Figure 13:
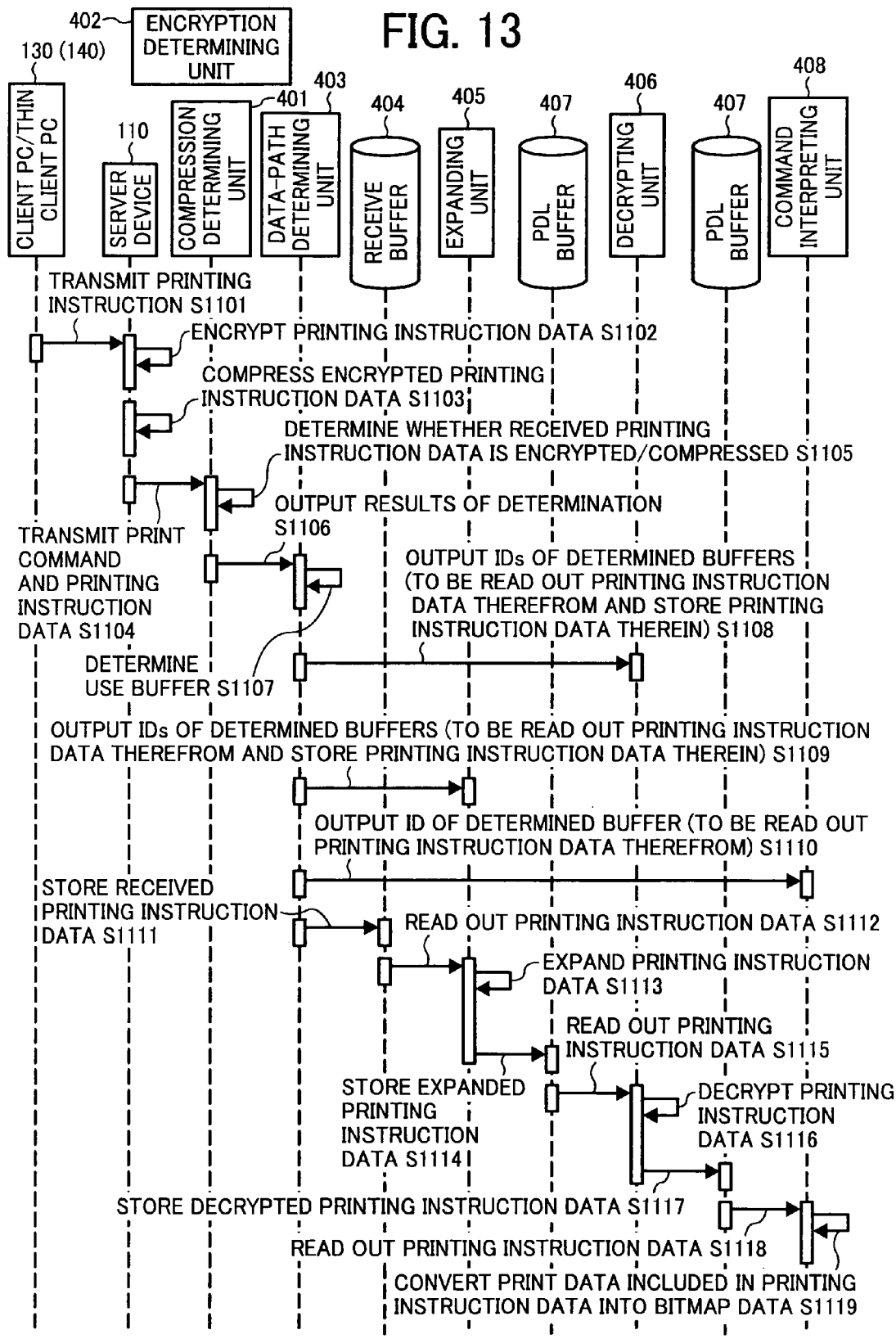
FIG. 13 is a timing chart for explaining a flow of printing instruction data in the image processing system shown in FIG. 1 when the printing instruction data is encrypted and then compressed.

FIG. 13 is a timing chart for explaining a flow of printing instruction data in the image processing system 100 when the printing instruction data is encrypted and then compressed.

First, the client PC 130 (or the thin client PC 140) transmits a printing instruction to the server device 110 via the network 150 (Step S1101). At this time, the client PC 130 (or the thin client PC 140) also transmits an instruction for encrypting printing instruction data and compressing the encrypted printing instruction data to the server device 110.

When the server device 110 receives the instructions from the client PC 130 (or the thin client PC 140), the encrypting unit 204 encrypts whole printing instruction data including print data on a graphic and a text and information written in the PJL (Step S1102).

Then, the compressing unit 206 compresses the printing instruction data encrypted at Step S1102 (Step S1103).

After that, the server device 110 transmits a print command together with the encrypted and compressed printing instruction data to the image forming apparatus 120 (Step S1104).

When the image forming apparatus 120 receives the print command and the printing instruction data from the server device 110, the compression determining unit 401 determines whether the received printing instruction data is compressed data and also the encryption determining unit 402 determines whether the received printing instruction data is encrypted (Step S1105).

When the compression determining unit 401 determines that the received printing instruction data is compressed data and also the encryption determining unit 402 determines that the received printing instruction data is encrypted, the compression determining unit 401 and the encryption determining unit 402 respectively output a result of the determination to the data-path determining unit 403 (Step S1106).

Upon receiving the results of the determination from the compression determining unit 401 and the encryption determining unit 402, the data-path determining unit 403 determines destination buffers, i.e., any of the receive buffers in the receive buffer 404 and any of the PDL buffers in the PDL buffer 407 (used for temporarily storing therein the printing instruction data) based on the results of the determination (Step S1107).

The data-path determining unit 403 outputs IDs of the destination first and second PDL buffers to the decrypting unit 406 so that the decrypting unit 406 can read out the printing instruction data from the first PDL buffer corresponding to the ID and store the printing instruction data in the second PDL buffer corresponding to the ID after the decrypting unit 406 decrypts the printing instruction data (Step S1108).

Furthermore, the data-path determining unit 403 outputs an ID of the destination receive buffer and the ID of the destination first PDL buffer to the expanding unit 405 so that the expanding unit 405 can read out the printing instruction data from the receive buffer corresponding to the ID and store the printing instruction data in the first PDL buffer corresponding to the ID after the expanding unit 405 expands the printing instruction data (Step S1109).

Moreover, the data-path determining unit 403 outputs the ID of the destination second PDL buffer to the command interpreting unit 408 so that the command interpreting unit 408 can read out the printing instruction data from the second PDL buffer corresponding to the ID (Step S1110).

After that, the data-path determining unit 403 stores the received printing instruction data in the destination receive buffer in the receive buffer 404 (Step S1111).

The expanding unit 405 reads out the printing instruction data stored by the data-path determining unit 403 at Step S1111 from the receive buffer corresponding to the ID in the receive buffer 404 (Step S1112).

The expanding unit 405 expands the printing instruction data read out at Step S1112 (Step S1113).

The expanding unit 405 stores the printing instruction data expanded at Step S1113 in the first PDL buffer corresponding to the ID in the PDL buffer 407 (Step S1114).

The decrypting unit 406 reads out the printing instruction data stored by the expanding unit 405 at Step S1114 from the first PDL buffer corresponding to the ID in the PDL buffer 407 (Step S1115).

The decrypting unit 406 decrypts the printing instruction data read out at Step S1115 (Step S1116).

The decrypting unit 406 stores the printing instruction data decrypted at Step S1116 in the second PDL buffer corresponding to the ID in the PDL buffer 407 (Step S1117).

The command interpreting unit 408 reads out the printing instruction data stored by the decrypting unit 406 at Step S1117 from the second PDL buffer corresponding to the ID in the PDL buffer 407 (Step S1118).

The command interpreting unit 408 converts the print data included in the printing instruction data read out at Step S1118 into bitmap data (Step S1119).

Figure 14:
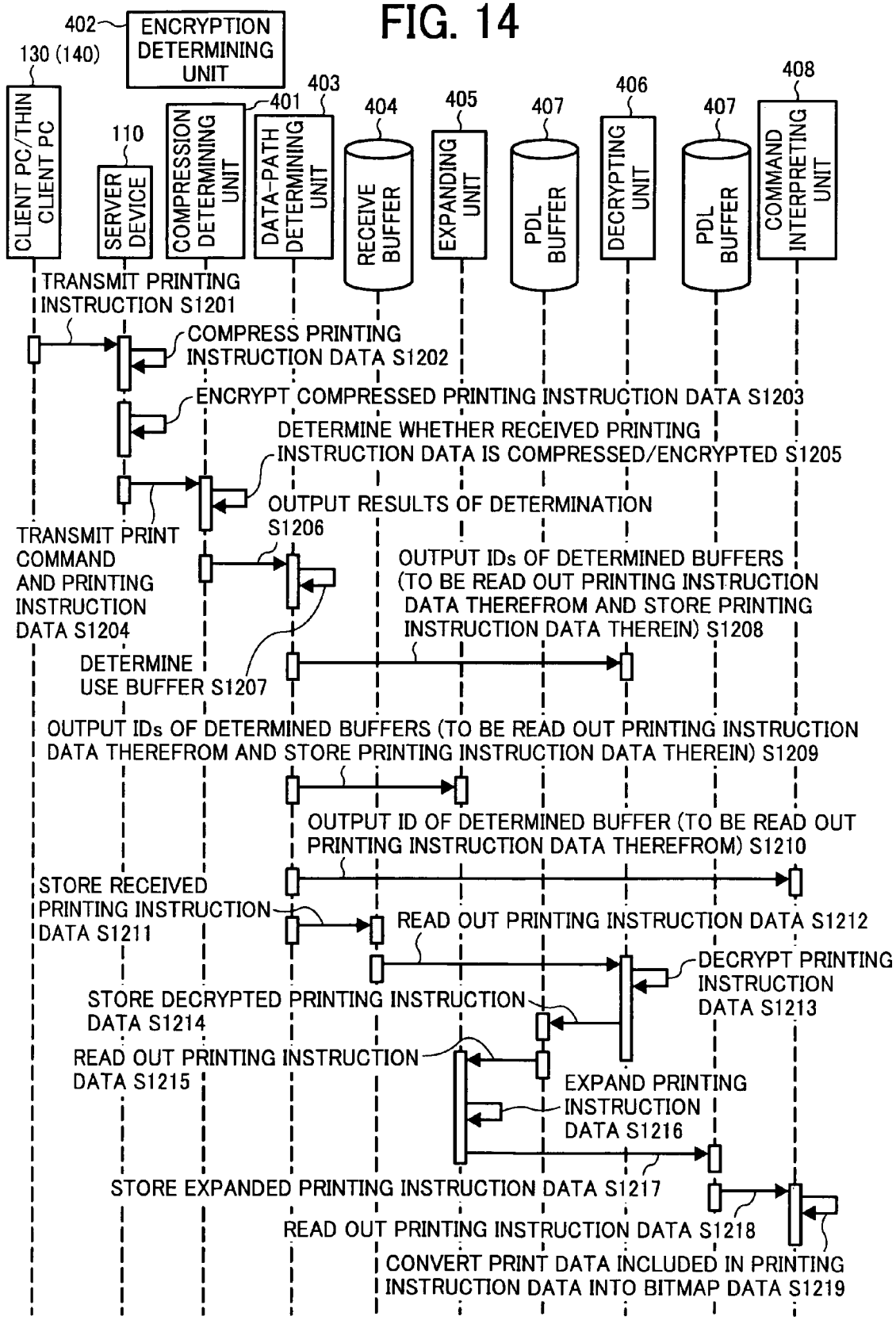
FIG. 14 is a timing chart for explaining a flow of printing instruction data in the image processing system shown in FIG. 1 when the printing instruction data is compressed and then encrypted.
Figure 16:
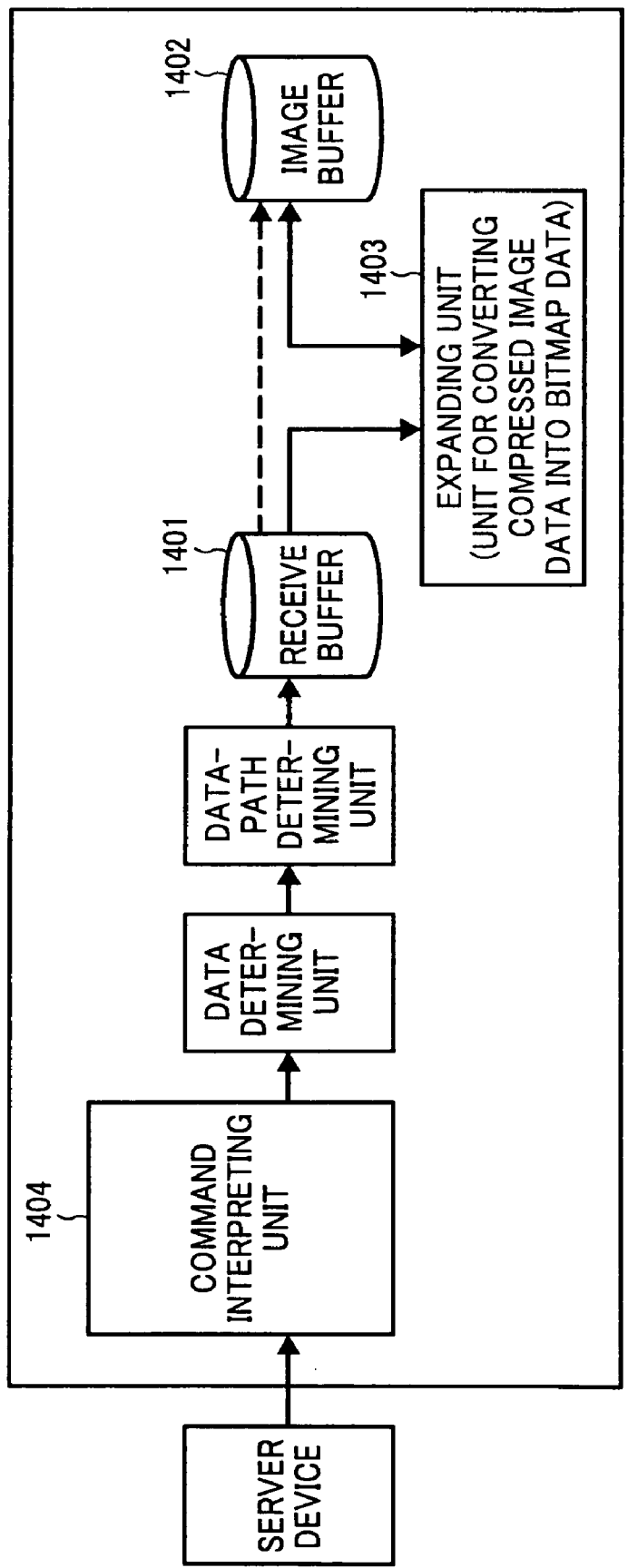
FIG. 16 is a block diagram of an example of a schematic configuration of a conventional image forming apparatus.

FIG. 14 is a timing chart for explaining a flow of printing instruction data in the image processing system 100 when the printing instruction data is compressed and then encrypted.

First, the client PC 130 (or the thin client PC 140) transmits a printing instruction to the server device 110 via the network 150 (Step S1201). At this time, the client PC 130 (or the thin client PC 140) also transmits an instruction for compressing printing instruction data and encrypting the compressed printing instruction data to the server device 110.

When the server device 110 receives the instructions from the client PC 130 (or the thin client PC 140), the compressing unit 206 compresses whole printing instruction data including print data on a graphic and a text and information written in the PJL (Step S1202).

Then, the encrypting unit 204 encrypts the printing instruction data compressed at Step S1202 (Step S1203).

After that, the server device 110 transmits a print command together with the compressed and encrypted printing instruction data to the image forming apparatus 120 (Step S1204).

When the image forming apparatus 120 receives the print command and the printing instruction data from the server device 110, the encryption determining unit 402 determines whether the received printing instruction data is encrypted and also the compression determining unit 401 determines whether the received printing instruction data is compressed data (Step S1205).

When the encryption determining unit 402 determines that the received printing instruction data is encrypted and also the compression determining unit 401 determines that the received printing instruction data is compressed data, the encryption determining unit 402 and the compression determining unit 401 respectively output a result of the determination to the data-path determining unit 403 (Step S1206).

Upon receiving the results of the determination from the encryption determining unit 402 and the compression determining unit 401, the data-path determining unit 403 determines destination buffers, i.e., any of the receive buffers in the receive buffer 404 and any of the PDL buffers in the PDL buffer 407 (used for temporarily storing therein the printing instruction data) based on the results of the determination (Step S1207).

The data-path determining unit 403 outputs an ID of the destination receive buffer and an ID of the destination first PDL buffer to the decrypting unit 406 so that the decrypting unit 406 can read out the printing instruction data from the receive buffer corresponding to the ID and store the printing instruction data in the first PDL buffer corresponding to the ID after the decrypting unit 406 decrypts the printing instruction data (Step S1208).

Furthermore, the data-path determining unit 403 outputs the ID of the destination first PDL buffer and an ID of the destination second PDL buffer to the expanding unit 405 so that the expanding unit 405 can read out the printing instruction data from the first PDL buffer corresponding to the ID and store the printing instruction data in the second PDL buffer corresponding to the ID after the expanding unit 405 expands the printing instruction data (Step S1209).

Moreover, the data-path determining unit 403 outputs the ID of the destination second PDL buffer to the command interpreting unit 408 so that the command interpreting unit 408 can read out the printing instruction data from the second PDL buffer corresponding to the ID (Step S1210).

After that, the data-path determining unit 403 stores the received printing instruction data in the destination receive buffer in the receive buffer 404 (Step S1211).

The decrypting unit 406 reads out the printing instruction data stored by the data-path determining unit 403 at Step S1211 from the receive buffer corresponding to the ID in the receive buffer 404 (Step S1212).

The decrypting unit 406 decrypts the printing instruction data read out at Step S1212 (Step S1213).

The decrypting unit 406 stores the printing instruction data decrypted at Step S1213 in the first PDL buffer corresponding to the ID in the PDL buffer 407 (Step S1214).

The expanding unit 405 reads out the printing instruction data stored by the decrypting unit 406 at Step S1214 from the first PDL buffer corresponding to the ID in the PDL buffer 407 (Step S1215).

The expanding unit 405 expands the printing instruction data read out at Step S1215 (Step S1216).

The expanding unit 405 stores the printing instruction data expanded at Step S1216 in the second PDL buffer corresponding to the ID in the PDL buffer 407 (Step S1217).

The command interpreting unit 408 reads out the printing instruction data stored by the expanding unit 405 at Step S1217 from the second PDL buffer corresponding to the ID in the PDL buffer 407 (Step S1218).

The command interpreting unit 408 converts the print data included in the printing instruction data read out at Step S1218 into bitmap data (Step S1219).

In this manner, when the expanding unit 405 and the decrypting unit 406 respectively receive the IDs of the read/write buffers from the data-path determining unit 403, the expanding unit 405 and the decrypting unit 406 always read out the printing instruction data from the read buffer corresponding to the ID and stores the printing instruction data in the write buffer corresponding to the ID. Therefore, if no data is stored in the read buffer, each of the expanding unit 405 and the decrypting unit 406 apparently stops the reading process. To avoid such a situation, each of the expanding unit 405 and the decrypting unit 406 is informed of IDs of the read/write buffers, and thereby improving the processing efficiency.

Furthermore, the image forming apparatus 120 can be configured to include a plurality of the expanding units 405 as well as the receive buffer 404 and the PDL buffer 407 those including a plurality of the buffers. When the image forming apparatus 120 includes a plurality of the expanding units 405, the image forming apparatus 120 can execute an interrupt print job. In this case, the data-path determining unit 403 determines a destination buffer based on a job priority of the received printing instruction data, and allocates an ID of the destination buffer to the printing instruction data. For example, when the print job is interrupted, i.e., a new print command for different printing instruction data (second printing instruction data) is transmitted from the server device 110, the second printing instruction data is not stored in the receive buffer 404, so that the expanding unit 405 handling the second printing instruction data apparently stops the writing process. When the expanding unit 405 handling the second printing instruction data is informed of IDs of read/write buffers for the second printing instruction data, the expanding unit 405 can start the reading/writing processes of the second printing instruction data. Incidentally, when the second printing instruction data is non-compressed data, the command interpreting unit 408 can read out the second printing instruction data directly from the receive buffer 404 as described above. Flows of two sets of printing instruction data in the image processing system 100 during execution of an interrupt print job is explained in detail below with reference to FIG. 15.

FIG. 15 is a timing chart for explaining flows of two sets of printing instruction data in the image processing system 100 during execution of an interrupt print job. For the sake of convenience, the two sets of printing instruction data are referred to as first printing instruction data and second printing instruction data, respectively. In addition, the expanding unit 405 handling the first printing instruction is referred to as the first expanding unit 405, and the expanding unit 405 handling the second printing instruction is referred to as the second expanding unit 405.

First, the client PC 130 (or the thin client PC 140) transmits a printing instruction to the server device 110 via the network 150 (Step S1301). At this time, the client PC 130 (or the thin client PC 140) also transmits an instruction for compressing first printing instruction data to the server device 110.

When the server device 110 receives the instructions from the client PC 130 (or the thin client PC 140), the compressing unit 206 compresses whole first printing instruction data including print data on a graphic and a text and information written in the PJL (Step S1302).

After that, the server device 110 transmits a print command together with the compressed first printing instruction data to the image forming apparatus 120 (Step S1303).

When the image forming apparatus 120 receives the print command and the first printing instruction data from the server device 110, the compression determining unit 401 determines whether the received first printing instruction data is compressed data (Step S1304). Incidentally, when the first printing instruction data is compressed data, the compression determining unit 401 can determine a compression format of the first printing instruction data by verifying the magic number written on a header of the first printing instruction data.

When the compression determining unit 401 determines that the first printing instruction data is compressed data, the compression determining unit 401 outputs a result of the determination to the data-path determining unit 403 (Step S1305).

Upon receiving the result of the determination from the compression determining unit 401, the data-path determining unit 403 determines destination buffers, i.e., any of the receive buffers in the receive buffer 404 and any of the PDL buffers in the PDL buffer 407 (used for temporarily storing therein the first printing instruction data) based on the result of the determination (Step S1306).

The data-path determining unit 403 outputs an ID of the destination receive buffer and an ID of the destination PDL buffer to the first expanding unit 405 so that the first expanding unit 405 can read out the first printing instruction data from the receive buffer corresponding to the ID and store the first printing instruction data in the PDL buffer corresponding to the ID after the first expanding unit 405 expands the first printing instruction data (Step S1307).

Furthermore, the data-path determining unit 403 outputs the ID of the destination PDL buffer to the command interpreting unit 408 so that the command interpreting unit 408 can read out the first printing instruction data from the PDL buffer corresponding to the ID (Step S1308).

After that, the data-path determining unit 403 stores the received first printing instruction data in the destination receive buffer in the receive buffer 404 (Step S1309).

The first expanding unit 405 reads out the first printing instruction data stored by the data-path determining unit 403 at Step S1309 from the receive buffer corresponding to the ID in the receive buffer 404 (Step S1310).

The first expanding unit 405 expands the first printing instruction data read out at Step S1310 (Step S1311).

The first expanding unit 405 stores the first printing instruction data expanded at Step S1311 in the PDL buffer corresponding to the ID in the PDL buffer 407 (Step S1312).

The command interpreting unit 408 reads out the first printing instruction data stored by the first expanding unit 405 at Step S1312 from the PDL buffer corresponding to the ID in the PDL buffer 407 (Step S1313).

The command interpreting unit 408 converts the print data included in the first printing instruction data read out at Step S1313 into bitmap data (Step S1314).

In parallel with a series of the above processes at Steps S1301 to S1314, the following processes are performed.

The client PC 130 (or the thin client PC 140) transmits a printing instruction to the server device 110 via the network 150 (Step S1315). At this time, the client PC 130 (or the thin client PC 140) also transmits an instruction for compressing second printing instruction data to the server device 110.

When the server device 110 receives the instructions from the client PC 130 (or the thin client PC 140), the compressing unit 206 compresses whole second printing instruction data including print data on a graphic and a text and information written in the PJL (Step S1316).

After that, the server device 110 transmits a print command together with the compressed second printing instruction data to the image forming apparatus 120 (Step S1317).

When the image forming apparatus 120 receives the print command and the second printing instruction data from the server device 110, the compression determining unit 401 determines whether the received second printing instruction data is compressed data (Step S1318). Incidentally, when the second printing instruction data is compressed data, the compression determining unit 401 can determine a compression format of the second printing instruction data by verifying the magic number written on a header of the second printing instruction data.

When the compression determining unit 401 determines that the second printing instruction data is compressed data, the compression determining unit 401 outputs a result of the determination to the data-path determining unit 403 (Step S1319).

Upon receiving the result of the determination from the compression determining unit 401, the data-path determining unit 403 determines destination buffers, i.e., any of the receive buffers in the receive buffer 404 and any of the PDL buffers in the PDL buffer 407 (used for temporarily storing therein the second printing instruction data) based on a job priority of the received second printing instruction data (Step S1320).

The data-path determining unit 403 outputs an ID of the destination receive buffer and an ID of the destination PDL buffer to the second expanding unit 405 so that the second expanding unit 405 can read out the second printing instruction data from the receive buffer corresponding to the ID and store the second printing instruction data in the PDL buffer corresponding to the ID after the second expanding unit 405 expands the second printing instruction data (Step S1321).

Furthermore, the data-path determining unit 403 outputs the ID of the destination PDL buffer to the command interpreting unit 408 so that the command interpreting unit 408 can read out the second printing instruction data from the PDL buffer corresponding to the ID (Step S1322).

After that, the data-path determining unit 403 stores the received second printing instruction data in the destination receive buffer in the receive buffer 404 (Step S1323).

The second expanding unit 405 reads out the second printing instruction data stored by the data-path determining unit 403 at Step S1323 from the receive buffer corresponding to the ID in the receive buffer 404 (Step S1324).

The second expanding unit 405 expands the second printing instruction data read out at Step S1324 (Step S1325).

The second expanding unit 405 stores the second printing instruction data expanded at Step S1325 in the PDL buffer corresponding to the ID in the PDL buffer 407 (Step S1326).

The command interpreting unit 408 reads out the second printing instruction data stored by the second expanding unit 405 at Step S1326 from the PDL buffer corresponding to the ID in the PDL buffer 407 (Step S1327).

The command interpreting unit 408 converts the print data included in the second printing instruction data read out at Step S1327 into bitmap data (Step S1328).

Incidentally, in the timing chart shown in FIG. 15, there is explained a case of the interrupt print job when two sets of printing instruction data are compressed data. When two sets of printing instruction data are encrypted but not compressed, the image forming apparatus 120 is configured to include a plurality of the decrypting units 406, whereby the image forming apparatus 120 can execute an interrupt print job when two sets of printing instruction data are encrypted in the same manner as that is shown in FIG. 15.

As described above, in the image processing system 100 according to the embodiment, not only the large volume data but whole printing instruction data including print data on a graphic and a text and information written in the PJL is compressed by the server device 110, and then the compressed printing instruction data is transmitted to the image forming apparatus 120. Therefore, network traffic between the server device 110 and the image forming apparatus 120 can be reduced, and thus it is possible to transmit/receive the printing instruction data efficiently.

Furthermore, in the image processing system 100, especially, in the side of the image forming apparatus 120, a data path of the printing instruction data differs depending on whether the printing instruction data is compressed data or non-compressed data, whereby the image forming apparatus 120 can efficiently process both the compressed printing instruction data and the non-compressed printing instruction data. Therefore, the image forming apparatus 120 can improve the efficiency of a print job, i.e., can shorten a time taken for the print job. When the image forming apparatus 120 receives compressed printing instruction data and non-compressed printing instruction data, if the non-compressed printing instruction data passes through the expanding unit 405 to the PDL buffer 407, it takes a relatively long time to process the non-compressed printing instruction data. To solve the problem, in the present embodiment, when the image forming apparatus 120 receives non-compressed printing instruction data, the command interpreting unit 408 reads out the non-compressed printing instruction data directly from the receive buffer 404. Therefore, the image forming apparatus 120 can improve the processing efficiency of the printing instruction data. Specifically, in the present embodiment, each of a plurality of the buffers included in the image forming apparatus 120 is assigned with a unique ID, and the IDs are managed by being stored in the ID control table. Therefore, the image forming apparatus 120 can determine an optimum data path of the printing instruction data based on the ID control table, and thus it is possible to improve the processing efficiency.

Moreover, by providing a plurality of the expanding units 405 or a plurality of the decrypting units 406 to the image forming apparatus 120, the image forming apparatus 120 can execute an interrupt print job.

Furthermore, the present embodiment supports the encryption of printing instruction data to be transmitted, so that the present embodiment can be applied to a print job for a confidential document.

Incidentally, an image processing method explained in the above embodiment can be realized by causing a computer, such as a personal computer or a workstation, to execute an image processing program. The image processing program is stored in a computer-readable recording medium, such as a hard disk drive (HDD), a flexible disk (FD), a compact disk read-only memory (CD-ROM), a magnetooptic disk (MO), or a digital versatile disk (DVD). The computer reads out the image processing program from the recording medium, and executes the image processing program. Alternatively, the image processing program can be stored on a transmission medium capable of distributing the image processing program via a network such as the Internet.

According to an aspect of the present invention, printing instruction data is transmitted after not a large volume of image data included therein but the whole printing instruction data including print data on a graphic and a text and information written in the PJL is compressed. Therefore, network traffic between the server device and the image forming apparatus can be reduced, and thus it is possible to transmit/receive the printing instruction data efficiently.

Furthermore, according to another aspect of the present invention, especially, in the side of the image forming apparatus, a data path of the printing instruction data differs depending on whether the printing instruction data is compressed data or non-compressed data, whereby the image forming apparatus can efficiently process both the compressed printing instruction data and the non-compressed printing instruction data. Therefore, the image forming apparatus can improve the efficiency of a print job, i.e., can shorten a time taken for the print job.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising:
a server device connectable to a network and including
a creating unit that creates printing instruction data, the printing instruction data including print data and information related to the print data;
an encrypting unit that encrypts the printing instruction data thereby generating encrypted printing instruction data; and
a compressing unit that compresses the whole of the printing instruction data or whole of the encrypted printing instruction data;
an image forming apparatus connectable to the network and including
a first buffer that temporarily stores therein printing instruction data received via the network;
a compression determining unit that determines whether the printing instruction data is in compressed state;
an expanding unit that expands compressed printing instruction data to obtain expanded printing instruction data;
a second buffer that temporarily stores therein the expanded printing instruction data;
a command interpreting unit that reads out any of the printing instruction data from the first buffer and the expanded printing instruction data from the second buffer, and converts read data into bitmap data; and
a data-path determining unit that determines whether the printing instruction data temporarily-stored in the first buffer is to be sent to the expanding unit or to the command interpreting unit; and
a client personal computer or a thin client personal computer that controls transmission of printing instruction data from the server device to the image forming apparatus.

2. The image processing system of claim 1, wherein the information related to the print data includes job information for a print job for printing the print data.

3. The image processing system of claim 2, wherein the information related to the print data is in a Printer Job Language (PJL) format.

* * * * *